United States Patent
Levin et al.

(10) Patent No.: US 10,474,887 B2
(45) Date of Patent: Nov. 12, 2019

(54) IDENTIFYING A LAYOUT ERROR

(71) Applicant: HEWLETT PACKARD ENTERPRISE DEVELOPMENT LP, Houston, TX (US)

(72) Inventors: Amit Levin, Yehud (IL); Yaron Burg, Yehud (IL); Ilan Shufer, Yehud (IL); Olga Kogan, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 80 days.

(21) Appl. No.: 15/402,992

(22) Filed: Jan. 10, 2017

(65) Prior Publication Data

US 2018/0196785 A1    Jul. 12, 2018

(51) Int. Cl.
   *G06F 17/00*    (2019.01)
   *G06K 9/00*    (2006.01)
   *G06F 17/27*    (2006.01)

(52) U.S. Cl.
   CPC ..... *G06K 9/00449* (2013.01); *G06K 9/00463* (2013.01); *G06F 17/2725* (2013.01); *G06K 2209/01* (2013.01)

(58) Field of Classification Search
   CPC ............ G06F 17/2725; G06K 9/00523; G06K 9/00147
   See application file for complete search history.

(56) References Cited

U.S. PATENT DOCUMENTS

| | | | |
|---|---|---|---|
| 8,381,094 B1* | 2/2013 | Prasad | G06F 17/30861 709/203 |
| 8,490,059 B2 | 7/2013 | Huang | |
| 9,201,852 B2 | 12/2015 | Ge | |
| 9,208,054 B2 | 12/2015 | Prasad | |
| 9,411,782 B2 | 8/2016 | Harris et al. | |
| 2008/0276193 A1* | 11/2008 | Pettinati | G06F 3/0489 715/780 |
| 2010/0211893 A1 | 8/2010 | Fanning et al. | |
| 2011/0093773 A1 | 4/2011 | Yee | |
| 2014/0189491 A1* | 7/2014 | Saar | G06F 17/2288 715/234 |
| 2015/0339213 A1* | 11/2015 | Lee | G06F 11/3664 717/125 |
| 2016/0170963 A1* | 6/2016 | Bartley | G06F 17/212 715/760 |

OTHER PUBLICATIONS

Applitools.com, "Why Should I Visually Test my App with Applitools?" (Web Page), 2015, 7 pages, available at https://applitools.com/.
(Continued)

*Primary Examiner* — Andrew T McIntosh (57) ABSTRACT

First object model data from a first application state generated in a first browser mode may be collected. The first object model data may comprise a code-based representation of a first layout element and a second layout element of the first application state. According to a layout detection rule, a first attribute of the first layout element may be compared with a second attribute of the first layout element or of a second layout element. A layout error corresponding to the first layout element may be identified based on the comparison of the first attribute with the second attribute.

11 Claims, 8 Drawing Sheets

(56) References Cited

OTHER PUBLICATIONS

BrowerBite.com, "Automatic Cross Browser Layout Testing," (Web Page), 2016, 9 pages, available at http://browserbite.com/.

Cai, D. et al., "VIPS: A Vision-based Page Segmentation Algorithm," (Web Page), Nov. 1, 2003, 2 pages, avaiiable at https://www.microsoft.com/en-us/research/publication/vips-a-vision-based-page-segmentation-algorithm/.

Canluse.com, "Index of Features," (Web Page), Oct. 2016, 3 pages, available at http://caniuse.com/.

Choudhary, S.R. et al., "A Cross-browser Web Application Testing Tool," (Web Page), Sep. 2010, 6 pages, available at http://shauvik.com/public/pubs/roychoudhary10icsm_tool.pdf.

Google Code, "Fighting-Layout-Bugs," (Web Page), Oct. 20, 2009, 2 pages, available at https://code.google.com/archive/p/fighting-layout-bugs/.

JuicyStudio.com, "Luminosity Colour Contrast Ratio Analyser," (Web Page), 2016, 2 pages, available at http://juicystudio.com/services/luminositycontrastratio.php#specify.

Lambert, R., "Fighting Layout Bugs . . . Fight," (Web Page), May 26, 2011, 5 pages, available at http://thesocialtester.co.uk/fighting-layout-bugs-fight/.

Mesbah, A. et al., "Automated Cross-Browser Compatibility Testing," 2011, Proceedings of the 33rd International Conference on Software Engineering, ACM, 2011, 10 pages, available at http://www.cs.columbia.edu/~junfeng/14fa-e6121/papers/browser-compat.pdf.

Ochin, J. G., "Cross Browser Incompatibility: Reasons and Solutions," (Research Paper), International Journal of Software Engineering & Applications 2.3, Jul. 2011, 12 pages.

Semenenko, N. et al., "Browserbite: Accurate Cross-Browser Testing via Machine Learning Over Image Features," Sep. 2014, 4 pages, available at http://lepo.it.da.ut.ee/~dumas/pubs/icsm2013Browserbite.pdf.

W3Schools.com, "CSS3 Browser Support Reference," (Web Page), 10 pages, retrieved on Nov. 28, 2016 at http://www.w3schools.com/cssref/css3_browsersupport.asp.

"Can I use . . . Support tables for HTML5, CSS3, etc." retrieved from internet Sep. 14, 2018, 2 pages. <http://caniuse.com/>.

Applitools. "AI Powered Visual UI Testing & Monitoring", retrieved from Internet on Sep. 14, 2018, 9 pages. <https://applitools.com/>.

Saar, et al., "Browserbite: Accurate Cross-Browser Testing via Machine Learning Over Image Features", In Proceedings of the 14th International Conference on Web Engineering (ICWE), Toulouse, France, Sep. 2014, IEEE computer society, 4 pages. <http://lepo.it.da.ut.ee/~dumas/pubs/icsm2013Browserbite.pdf>.

\* cited by examiner

IDENTIFYING A LAYOUT ERROR

BACKGROUND

User Interface (UI) testing is the process in which an interface of an application is tested to determine whether the interface of the application is displaying or functioning correctly and meeting its written specifications. An application may be displayed in a browser and the display of the application may vary depending on the type of browser in which the application is displayed.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Examples are provided for detecting layout inconsistencies of an application state generated in a browser mode. Not all browsers render source code in an identical manner, as different browsers may interpret source code differently. This may cause cross browser compatibility issues. Source code for instance, may have any number of layout errors when visually rendered. These layout errors may include, for example, textual characters being displayed incorrectly in a visual rendering, including the following: textual characters not displayed or not accessible to a user; horizontal or vertical broken text, e.g. partially displayed text; floating text, such as text overflowing outside of a border, e.g. a textbox, intended to encompass the text; text located incorrectly within the visual rendering, such as misaligned text, text too close to a visually rendered border or overlapping a visually rendered border; text displayed with an incorrect size or font, such as text that is too small for a user to read; etc.

Other layout errors may be displayed in a visual rendering of an application state. For instance, images intended to be displayed may be missing from the visual rendering; inconsistent colors or inconsistent design elements may be displayed; components, such as textboxes, buttons, scrolling indicators etc., may be misaligned, located incorrectly, or otherwise not displayed; the contrast, i.e. the difference in color and/or brightness, between visually rendered elements may be too low such that a user may have trouble visually distinguishing the elements; dates may display incorrectly with respect to the standard of formatting applied by a geographic region in which the dates are displayed; a tab order, i.e., the order in which a visually rendered application state is navigated by tabbing, may be non-sequential such that tabbed navigation of the visual rendering does not follow a sequential progression; etc.

Layout errors, such as those described above, may be detected through application of an error detection rule against object model data of an application state. Object model data, including data in the form of a document object model (DOM) may comprise various elements, such as images, text, hyperlinks, controls, forms, and scripts to handle performing functions for a web application implemented to display an application state.

Object model data may comprise a language-independent code-based representation of a plurality of elements associated with a user interface for an application. Object model data may provide for representing and interacting with objects in, for example, HTML, XHTML, and XML based application states. The elements of such application states may be organized in a tree structure. Objects in the tree structure may be addressed and manipulated by using methods from various programming languages on the objects. Layout elements may be represented in the tree structures, where attributes of the layout elements may branch from, or are grouped within, the representation of the layout elements to which they are attributed. When the object model data is visually rendered, a browser mode may load the object model data into memory and parse each of the elements in the tree structure to translate at least some of the elements into visible user interface elements as applicable.

Various examples provided herein relate to systems and methods for detecting layout errors of an application state. A layout error detection rule may be applied against object model data of an application state generated in a browser mode. Specifically, first object model data from a first application state generated in a browser mode is collected. The first object model data may comprise a code-based representation of layout elements of an application state, such as a first layout element and a second layout element. In one example, a layout error detection rule may compare a first attribute of the first layout element with a second attribute. The second attribute may be of the first layout element or of a second layout element. A layout error corresponding to the first layout element may be identified based on the comparison of the first attribute with the second attribute.

In another example, first object model data is collected from an application state. The first object model data may comprise a code-based representation of a plurality of layout elements of the application state. A layout error detection rule may determine a threshold amount of a particular attribute of the plurality of layout element of the application state. A first layout element that has an attribute value for the particular attribute that does not meet the threshold amount determined by the layout error detection rule may be identified, the identified first layout element exhibiting a layout error.

In yet another example, first object model data from an application state is collected from an application state generated in a first browser mode. The first object model data may comprise a code-based representation of a layout element of an application state, such as a first layout element of the application state. A layout error detection rule may compare an attribute value of the first layout element with a predefined list of attribute values. A layout error corresponding to the first layout element may be identified where the attribute value of the first layout element does not match with any of the attribute values in the predefined list of attribute values.

In the following description, for purposes of explanation, numerous specific details are set forth in order to provide a thorough understanding of the present systems and methods. For some examples, the present systems and methods may be practiced without these specific details. Reference in the specification to "an example" or similar language means that a particular feature, structure, or characteristic described in connection with that example is included as described, but may not be included in other examples. In other instances, methods and structures may not be described in detail to avoid unnecessarily obscuring the description of the examples. Also, the examples may be used in combination with each other.

The following terminology is understood to mean the following when recited by the specification or the claims. The singular forms "a," "an," and "the" mean "one or more," The terms "including" and "having" are intended to have the same inclusive meaning as the term "comprising."

An internet browser is software that allows access to content on the internet. An internet browser may be a platform for calling up requests from sources, e.g. resource directories or servers, on which requested content is stored in the form of source code. A browser may render this source code for a particular application state such that aspects of the source code are visually depicted, e.g. in the form of a webpage. A browser mode may take the form of an internet browser able to call and render remote source code, or a browser mode may take the form of an offline platform able to emulate at least some of the functionality of an internet browser by rendering local source code offline.

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer-readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

Figure 1:
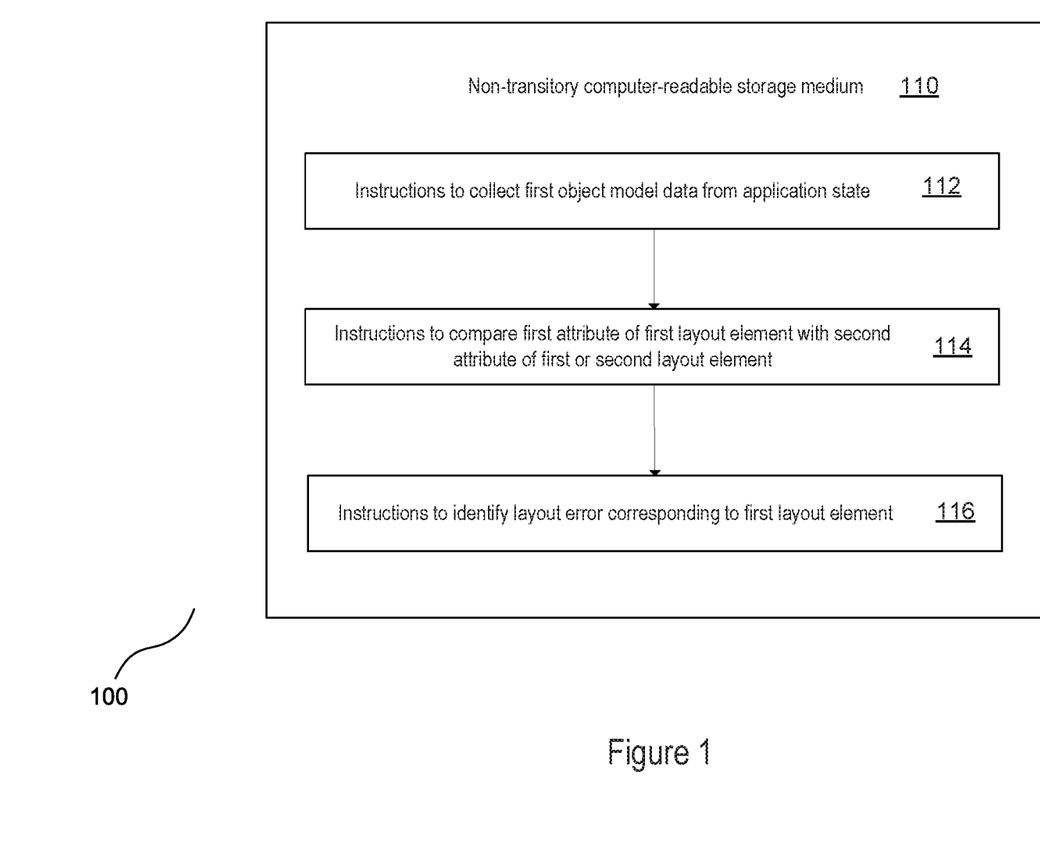
FIG. 1 is a block diagram illustrating a non-transitory computer-readable storage medium according to some examples.

FIG. 1 illustrates a block diagram 100 of an example non-transitory computer-readable storage medium 110 for identifying a layout error. The non-transitory computer-readable storage medium 110 may include instructions 112 executable by a processor to collect first object model data from an application state generated in a browser mode. The object model data may comprise a code-based representation of any number of layout elements of the application state, such as a first layout element and a second layout element of the application state. Through collection of the first object model data, any number of layout elements may be collected.

Included in the collection of layout elements may be attribute data of the layout elements. The attribute data may include descriptors of layout elements, and may be any descriptor of a programming language, such as properties recognized by HTML, XML, SVG, etc., or stylistic properties of a style sheet language, e.g. Cascading Style Sheets (CSS). Examples of an attribute for a layout element may include, but is not limited to, location, tag name, class, shape, color, luminosity, font, z-index, id, border, margin, padding, text content, window width, window height, image width, image height, scroll width, scroll height, tab value, transition duration, etc. The attributes may also include data regarding the state of a layout element, such as whether the layout element is to include text, whether the layout element is to include certain characters, whether overflow from the layout element, e.g. text that may run outside the layout element, is visible, etc. Accordingly, layout elements including attribute data for each respective layout element may be collected.

The non-transitory computer-readable storage medium 110 may include instructions 114 executable by a processor to implement a layout error detection rule, such as to compare a first attribute of the first layout element with a second attribute of the first layout element or of a second layout element of the application state. In one example, the compared first and second attribute may not be of the same type. For instance, a first window width may be compared to a second window width, or a window width may be compared to a window height, scroll height, transition duration, etc. The non-transitory computer-readable storage medium may also include instructions 116 to identify a layout error corresponding to the first layout element based on the comparison of the first attribute with the second attribute.

In one example, the computer-readable storage medium illustrated in FIG. 1 may contain instructions causing a processor to identify a layout error in the form of an image failing to display correctly on a visual rendering of an application state. For example, the first layout element may be a code-based representation of an image and executable instructions 114 may cause a processor to compare the height value and width value of the image to determine whether the image is to be displayed at the natural width and natural height of the image. Specifically, instructions 114 may cause a processor to ensure an image is to be displayed at the natural width and natural height of the image by determining that the height value and the width value of the image are set to zero. The instructions 114 may also cause a processor to determine whether the value of the transition duration of the image is set to zero in order to determine whether the image is an animation image. The instructions 114 may also cause a processor to determine whether the tag of the layout element indicates that the layout element is an image. Any number of these attributes may be compared such that a return of true would, for example, identify a layout error corresponding to the layout element, in this case the layout element being in the form of an image. For instance, where an attribute, such as a tag name to identify a layout element, does indicate that the layout element is an image; the value of the transition duration indicates the image is not an animation image; and the values of the height and width attributes are set to the natural height and width of the image; the instructions may cause a processor to return a value of true, indicating that an image is intended to be displayed in the visual rendering of the application state.

In another example, the example method illustrated in FIG. 0.1 may cause a processor to identify a layout error in the form of a calendar date order being inconsistent with a standard of a region, e.g. a geographic region, in which an application state is to be displayed. For example, a layout error may be identified where a day is displayed before a month in a region where the standard is to display a month before the day. Executable instructions 114 may cause a processor to compare an attribute of the date, such as the calendar date order, with an attribute of the date indicating the geographic region in which the application state is to be displayed. In other examples, executable instructions 114 may cause a processor to compare an attribute of the date, such as the calendar date order, with an attribute of a second layout element of the application state indicating a geographic region in which the application state is to be displayed.

In yet another example, the example method illustrated in FIG. 1 may identify a layout error in the form of a misalignment between a first layout element and a second layout element. Executable instructions 114 may cause a processor to compare a location of a code-based representation of the first layout element with a location of a code-based representation of the second layout element. Where the location of the first and second layout element do not share a particular relationship, such as a horizontal or vertical relationship, a layout error corresponding to the first layout element may be identified.

In a further example, the example method illustrated in FIG. 1 may identify a layout error in the form of a low contrast, i.e. the difference between color and/or light between two elements, such as a first and second layout element. For example, a layout error in the form of a low contrast might occur where the values between two colors and/or two luminosities of a first and second layout element are not sufficiently different such that a user may have difficulty visually distinguishing the first and second layout elements in a visual rendering. Executable instructions 114 may cause a processor to compare an attribute in the form of a luminosity value or color value of a first layout element with an attribute in the form of a luminosity value or color value of a second layout element of an application state. In one example, executable instructions 116 may cause a processor to identify a layout error based on a discrepancy value between a value of the first attribute of the first layout element and a value of the second attribute of the second layout element. Accordingly, layout errors may be identified for layout elements below a contrast threshold, e.g. the threshold in which color values are sufficiently different, the threshold in which luminosity values are sufficiently different, or a combination of the difference between the color values and the luminosity values.

Figure 2:
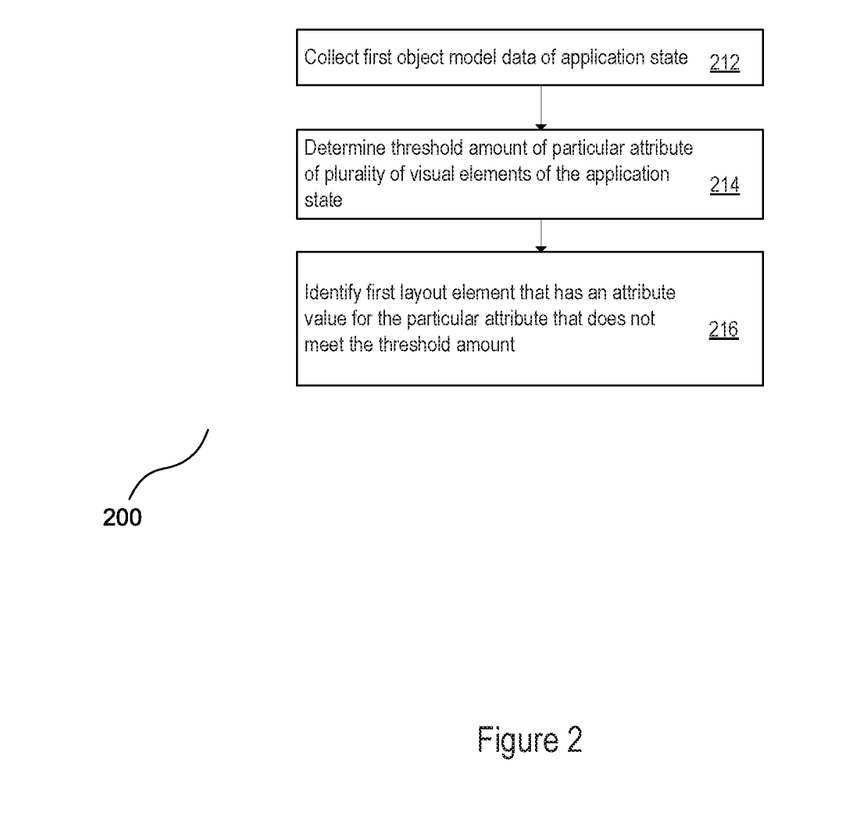
FIG. 2 is a flowchart illustrating a method according to some examples.

FIG. 2 is a flowchart 200 illustrating an example method for identifying a layout element exhibiting a layout error. The method may be implemented in the form of executable instructions stored on a computer-readable medium or in the form of electronic circuitry. For example, method 200 may be implemented by a processor executing the instructions of the non-transitory computer-readable medium illustrated in FIG. 1, FIG. 5, FIG. 6, FIG. 7 or by the processor of FIG. 3 executing the instructions of the system memory. The sequence of operations described in connection with FIG. 2 is not intended to be limiting, and an implementation consistent with the example of FIG. 2 may be performed in a different order than the example illustrated. Additionally, operations may be added or removed from the method 200.

To identify a layout error, instructions 212 may cause a processor to collect first object model data from an application state 212. The first object model data may comprise a code-based representation of a plurality of layout elements of the application state. Instructions 214 may cause a processor to execute a layout error detection rule. Specifically, instructions 214 may cause a processor to determine a threshold amount of a particular attribute of the plurality of layout elements of the application state 214. In one example, the layout detection rule may determine the threshold amount by collecting an attribute value for the particular attribute from each of the plurality of layout elements of the application state and determining the threshold amount from the collected attribute values. For example, the threshold amount may be determined through statistical analysis of the collected attribute values. In other examples, the threshold amount may be determined to be the number of occurrences of one of the collected attribute values, such as the number of occurrences of the collected attribute value that occurred the second or third most number of times relative to the other collected attribute values. In another example, the threshold amount may be determined to be a percentage, such as a percentage of one of the collected attribute values relative to other collected attribute values. In another example, the threshold amount of a particular attribute may be predetermined, e.g. predefined within the layout detection rule.

A particular attribute may be a tag name, class, shape, color, luminosity, font, z-index, id, border, margin, padding, text content, window width, window height, image width, image height, scroll width, scroll height, transition duration, etc. The attribute value of a particular attribute may correspond to a particular attribute type, such as a color code. For example, if the particular attribute is a color, a value of "FF0000" may indicate that the particular attribute is of the type red. If the particular attribute is a font for instance, a value of "Times New Roman" may indicate that the particular attribute is of the type Times New Roman.

For example, the number of occurrences collected for attribute value "FF0000," indicating the color red, may be ten, the number of occurrences collected for attribute value "FFFF00," indicating the color yellow, may be ten, and the number of occurrences collected for attribute value "008000," indicating the color green, may be one. From the collected attribute values, a threshold amount may be determined through statistical analysis, through frequency of occurrence of a particular attribute in a particular area of a visual rendering of an application state, or any number of other criteria. The threshold amount may or may not be one of the values of the collected attribute values. For example, the threshold amount may be statically derived from some mathematical combination of the collected values. As one example, the threshold amount from the collected attribute values may be determined to be the mean, median, or mode of the collected values, such as the value 7.

Instructions 216 may cause a processor to identify a first layout element that has an attribute value for the particular attribute that does not meet the threshold amount. In one example, the first layout element is identified as exhibiting a layout error. Referring back to the example provided above, the collected attribute value "008000" indicating the color green may be of the first layout element, and instructions 216 may cause a processor to identify the first layout element as having an attribute value for a color, e.g. green, that does not meet the threshold amount. The first layout element may thus be identified or otherwise flagged as exhibiting a layout error. Although color was used as the particular attribute in the example illustrated above, the same methodology may be applied to other types of attributes.

Figure 3:
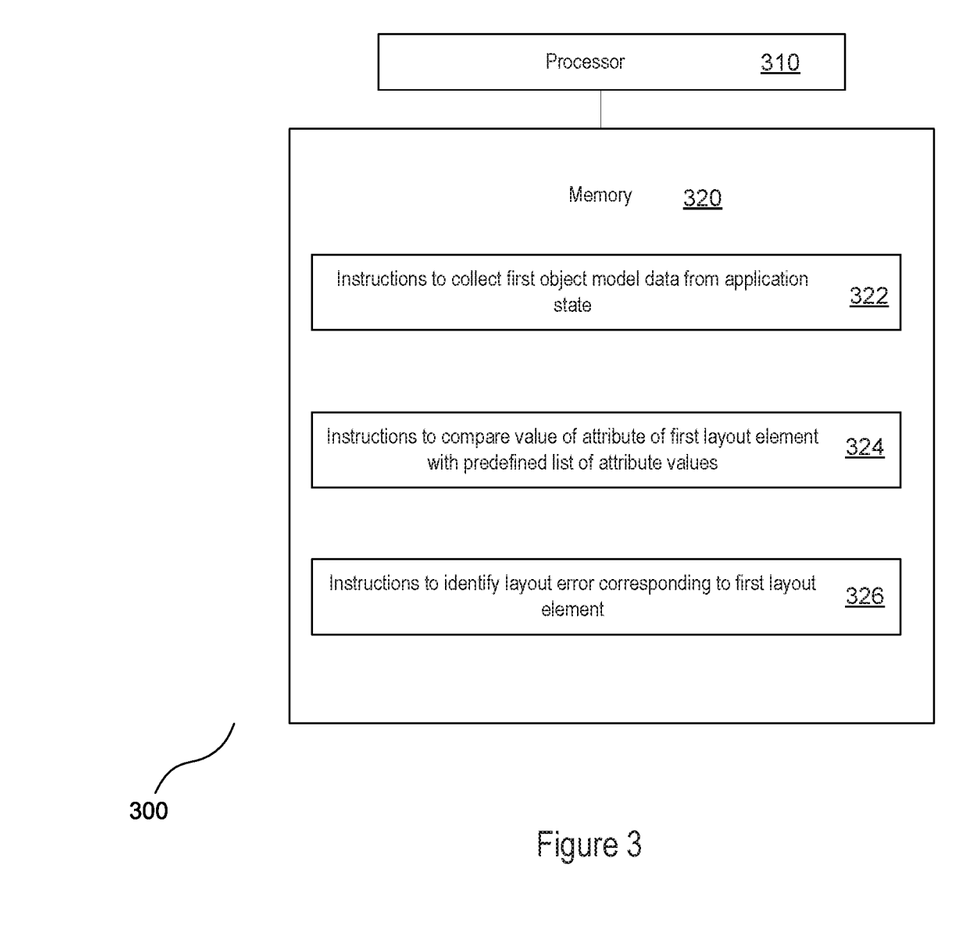
FIG. 3 is a block diagram illustrating a system according to some examples.

FIG. 3 is a block diagram illustrating a system 300 according to some examples. The system 300 may include a processor 310 and a memory 320. The memory 320 may include instructions 322 executable by the processor 310 to collect first object model data from an application state generated in a first browser mode. The first object model data may comprise a code-based representation of any number of layout elements of the application state, including a first layout element of the application state. The memory 320 may include instructions for executing a layout rule. Specifically, instructions 324 may cause a processor to compare an attribute value of the first layout element with a predefined list of attribute values. Additionally, the attribute value may correspond to a type of a particular attribute, such as a particular color, particular font, particular design element, etc.

As an example, instructions 324 may cause the processor to compare a color value of a layout element corresponding to a particular color to a color palette. As another example, instructions 324 may cause the processor to compare a font value of a layout element corresponding to a particular font to a list of acceptable fonts. The predefined list of attribute values may be local to the system illustrated in FIG. 3. For example, the predefined list of attribute values may be located in memory 320, or to any memory coupled to processor 310. In other examples, the predefined list of attribute values may be accessed via remote memory. Accordingly, a predefined list of attribute values may define the acceptable attributes for the application state.

The memory may include instructions 326 executable by the processor to identify a layout error corresponding to the first layout element. The first layout element, for example, may be identified for not matching with any of the attribute values in the predefined list of attribute values. For example, attribute value "008000," indicating the color green, may be of the first layout element and may be compared to a predefined list of color values. A layout error may be identified where attribute value "008000" does not appear on the predefined list of color values. While color was used in the example above, any number of particular attributes may be compared to a predefined list of attribute values, e.g. font, class, etc.

Figure 4A:
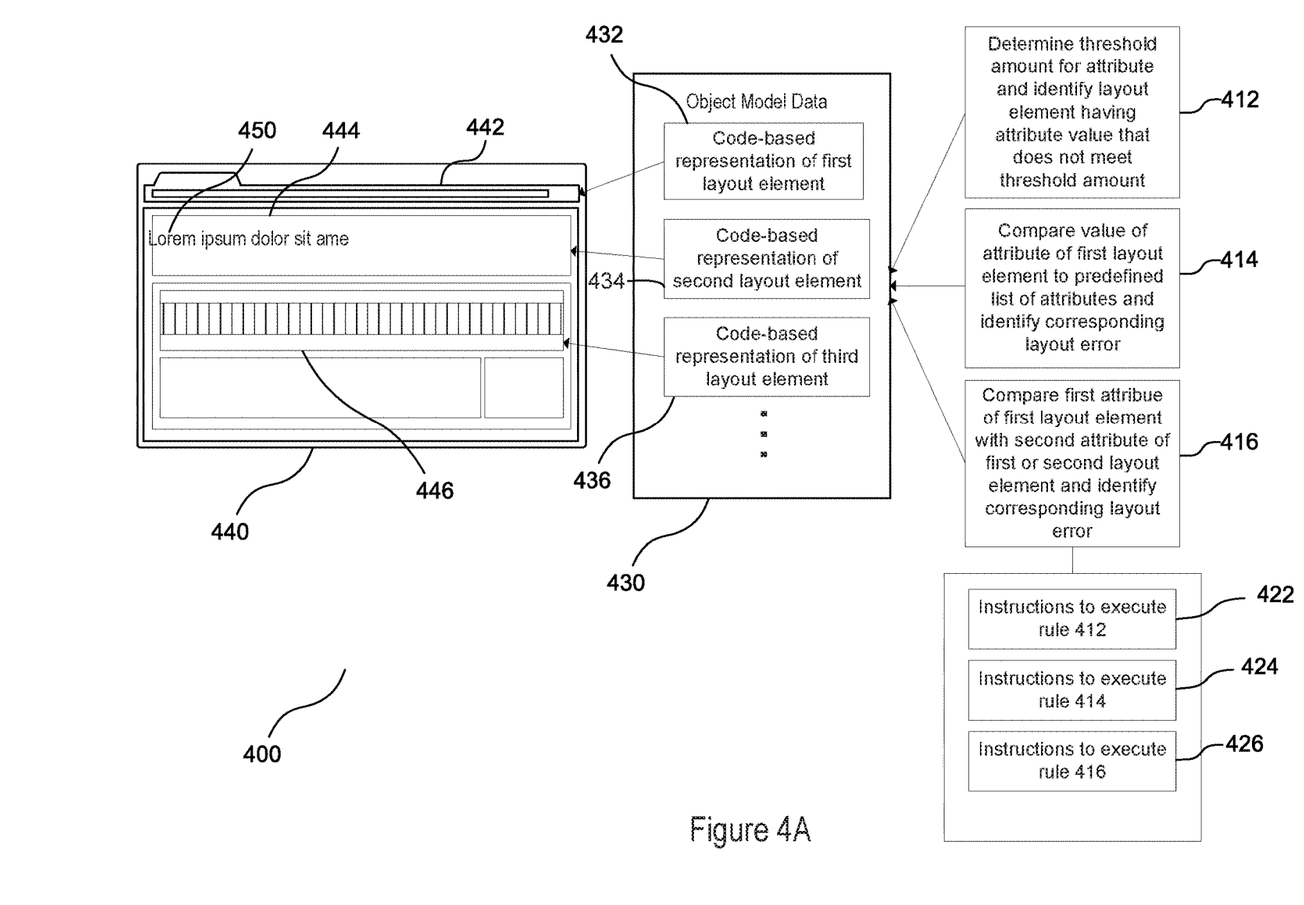
FIGS. 4A and 4B are block diagrams illustrating layout error detection rules applied against code-based representations of layout elements according to some examples.

Layout error detection rules, such as the layout error detection rules illustrated in FIG. 1, FIG. 2, and FIG. 3, above, may be applied against object model data, e.g. a DOM, to identify a layout error. FIG. 4A is an example block diagram of an environment 400 illustrating the application of layout error detection rules against code-based representations of layout elements. Specifically, layout error detection rules 412, 414, and 416, are applied against object model data 430. While three example layout error detection rules are applied in FIG. 4, any number of layout error detection rules may be applied. Layout error detection rules 412, 414, and 416 may be executed by instructions 422, 424, and 426 respectively. Instructions 422, 424, and 426 may exist in memory, such as memory 320 of FIG. 3, for example.

Object model data 430 may include code-based representations of any number of layout elements of an application state. In this example, object model data 430 includes a code-based representation of a first layout element 432, a code-based representation of a second layout element 434, and a code-based representation of a third layout element 436. An example visual rendering of an application state 440 is provided and an example visual rendering of the first layout element 442, the second layout element 444, and the third layout element 446 is included in the visual rendering of application state 440. An example layout error is provided in the form of overflow text 450 being displayed outside of the layout element 444. In this example, layout element 444 may be exhibiting a layout error. Through application of layout error detection rules such as rules 412, 414, and 416, against object model data 430 of an application state, a layout error, such as overflow text 450 of the application state may be identified.

Figure 5:
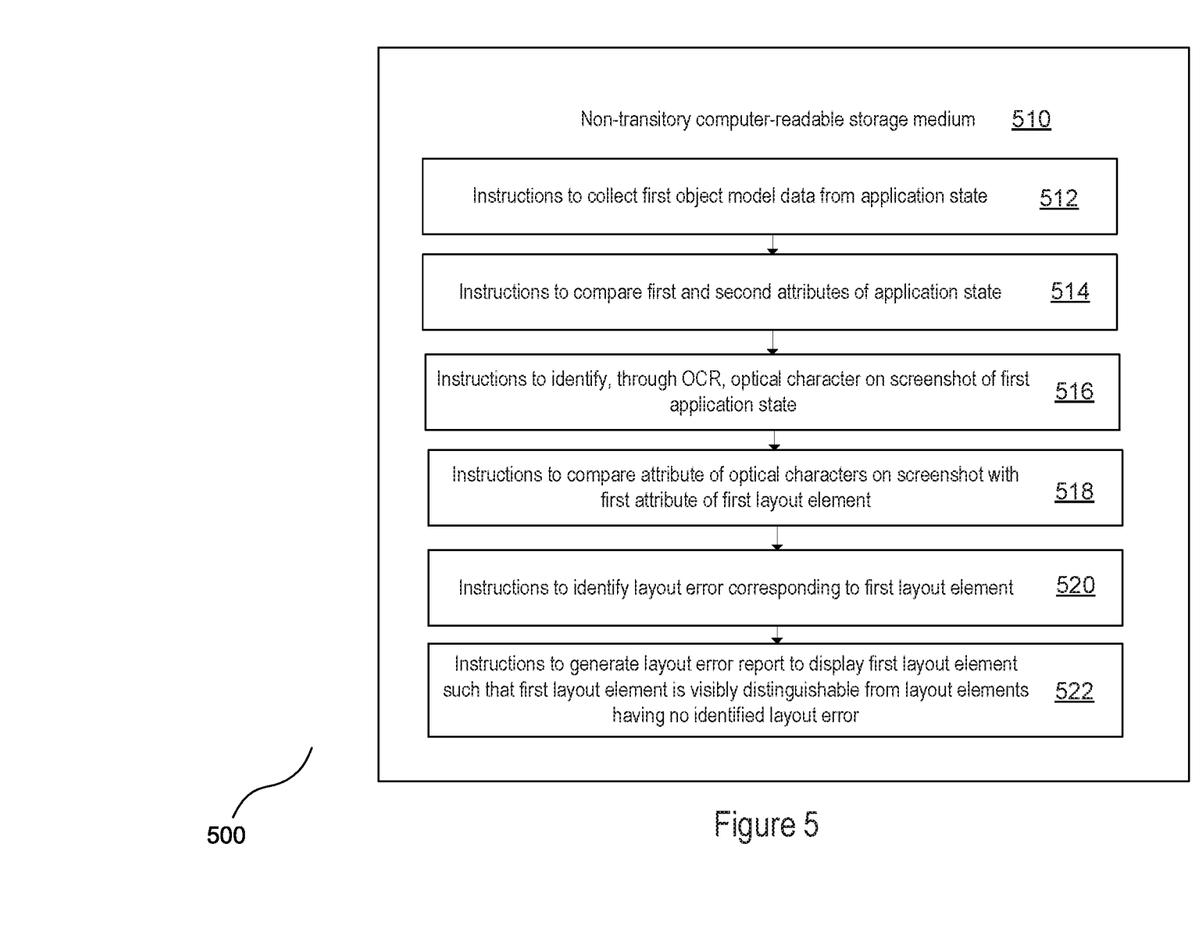
FIG. 5 is a block diagram further illustrating a non-transitory computer-readable storage medium according to some examples.

Upon identification of a layout error, a layout error report may be generated. FIG. 5 is a block diagram 500 further illustrating a non-transitory computer-readable storage medium 510 for identifying a layout error of an application state and generating a layout error report. The non-transitory computer-readable storage medium 510 may include instructions 512 executable by a processor to collect first object model data from an application state generated in a browser mode. The object model data may comprise a code-based representation of any number of layout elements of the application state, such as a first layout element and a second layout element of the application state. Through collection of the first object model data, any number of layout elements of the first object model data may be collected.

Included in the collection of layout elements may be attribute data of the layout elements. The attribute data may include descriptors of respective layout elements, such as a location, tag name, class, shape, color, luminosity, font, z-index, id, border, margin, padding, text content, window width, window height, image width, image height, scroll width, scroll height, tab value, transition duration, etc. The attributes may also include data regarding the state of a layout element, such as whether the layout element is to include text, whether the layout element is to include certain characters, whether overflow from the layout element is visible, etc. Accordingly, layout elements including attribute data for each respective layout element may be collected.

In one example, the method illustrated in FIG. 5 may identify a layout error in the form of text to be displayed such that some text may not be visible and/or accessible to a user within the visual rendering, e.g. in the form of scrolling, clicking, etc. To identify non-visible and/or non-accessible text, first object model data may be collected from the application state to display the text according to instructions 512. This object model data may include a code-based representation of a first layout element. In one example, the first layout element may be in the form of a textbox for including text. The collected first object model data may also include attributes of the first layout element, such as, the dimensions of the textbox and whether the textbox has a defined width and height, the scrolling capabilities associated with the textbox as well as the location of the scrolling capabilities, whether the textbox is to include text, whether an ellipsis occurs within the textbox to indicate continuing text not to be displayed, whether the textbox contains attributes recognized in a particular browser, etc. Accordingly, a code-based representation of a layout element, as well as attributes associated with the first layout element, may be collected.

The non-transitory computer-readable storage medium 510 may include instructions 514 executable by a processor to compare a first attribute of the first layout element with a second attribute of the first layout element or of a second layout element of the application state. In one example, the compared first and second attribute may not be of the same type. For instance, a first window width may be compared to a second window width, or a window width may be compared to a window height, scroll height, transition duration, etc. In one example, a layout error detection rule may be employed to implement instructions 514.

In one example, the second attribute is of the first layout element. For instance, the first attribute may be a scroll height and the scroll height may be compared to a second attribute of the first layout element, which may be an offset height of the first layout element. Through comparison of the scroll height and the offset height, it can be determined whether the first layout element, e.g. a textbox, contains a code-based representation of a scroll bar to be displayed. In another example, the first attribute may be a width of the first layout element and the width may be compared to a second attribute which may be a height of the first layout element. Through comparison of the width and height of the first layout element the dimensions of the first layout element may be determined.

As an additional example, a first attribute, which may signify that the first layout element is to contain text, may be compared to a second attribute, which may signify whether text may be visible outside the first layout element if the first layout element were to be visually rendered, or whether text would be hidden if falling outside the dimensions of the first layout element. The first attribute may also indicate a border width of the first layout element, such as a bottom border width, top border width, right or left border width, etc. This border width may be compared to a second attribute, which may indicate whether the first layout element contains more than one line of text. As yet another example, the first attribute may be a border color, and the border color may be compared to the second attribute, which may indicate a background color of a visual rendering of the application state. While a select number of examples are provided, any number of attributes may be compared and any combination of attributes may be compared.

By comparing the code-based representations of attributes of a layout element of an application state with characteristics of text as determined through optical character recognition of a visual rendering of the application state, layout errors may be identified. The non-transitory computer-readable storage medium may include instructions 516 to identify optical characters on a screenshot of a visual rendering of the application state. In one example, the optical characters are identified through optical character recognition of the screenshot. For example, the optical characters may be identified through conversion of optical characters within the screenshot into machine-encoded text. Identification of the optical characters may include determining an attribute of the optical characters on the screenshot, such as the location, color, style, size, etc., of the optical characters as they are depicted on the screenshot.

Source code may include text to be visibly rendered by a browser mode. However, a browser mode may not display text correctly. Examples of text not displayed correctly may include the following: textual characters not displayed or not be accessible to a user; horizontal or vertical broken text; floating text, such as text overflowing outside of a border, e.g. a textbox, intended to encompass the text; text located incorrectly within the visual rendering, such as misaligned text, text too close to a visually rendered border or overlapping a visually rendered border; text displayed with an incorrect size or font, such as text that is too small for a user to read; etc.

By comparing attributes of optical characters on a visual rendering of the application state with a code-based representation of layout elements of the application state, layout errors, including text-based layout errors, may be identified. Non-transitory computer-readable storage medium 510 may include instructions 518 to execute a layout error detection rule. Specifically, instructions 518 may cause a processor to compare an attribute of identified optical characters with the first attribute of the first layout element. Non-transitory computer-readable storage medium 510 may also include instructions 520 to identify a layout error corresponding to the first layout element.

A layout error corresponding to the first layout element may be identified according to instructions 520. In one example, the layout error of the first layout element is identified through comparison of the identified optical characters with the first attribute of the first layout element. For example, a location of the optical characters may be identified, and the location of the optical characters may be compared to a first attribute of the first layout element which may be a location and/or size of a textbox. A layout error may be identified through comparison of the location of the optical characters as compared to the location and/or size of the textbox. For example, the location and size of the textbox in comparison with the location of the optical characters may indicate that the text would not be displayed within the textbox, would not be fully displayed within the textbox, would appear too close to the border of the textbox, etc. A layout error may be identified where it is determined that the recognized optical characters on the screenshot are not displayed within the textbox, e.g. in the form of overflow text.

In one example, a layout error may not be identified even where the comparison of the location of the optical characters as compared to the location and/or size of the textbox does not indicate that all of the optical characters would be displayed within the textbox. For instance, if the comparison of the first attribute and the second attribute indicates that the textbox does not contain text, has a scroll bar, contains ellipses to indicate missing text, does not have a nonzero width or height, etc., a layout error may not be identified. Conversely, a layout error may be identified where it is determined that the textbox contains text, has a given size, does not have an associated scroll bar to be displayed, does not contain ellipses to indicate continued text, etc. Accordingly, a layout error may be identified based on the comparison of the first attribute with the second attribute according to instructions 514 in combination with the comparison of an attribute of the optical characters with the first attribute of the first layout element according to instructions 520.

A layout error report may be generated according to instructions 522. In one example, the layout error report may be displayed responsive to identifying a layout error corresponding to the first layout element. The layout error report may display the first layout element of the first application state on a visual depiction of the first application state such that the layout element is visibly distinguishable. Specifically, the layout report may display the first layout element of the first application state on a visual depiction of the first application state such that the layout element is visibly distinguishable from layout elements of the application state having no detected layout error. For example, the first layout element may be colored over a screenshot of the visual rendering of the application state. The first layout element may be circled or marked, or any number of visual indicators may be juxtaposed with the first layout element to visibly distinguish the first layout element.

Figure 4B:
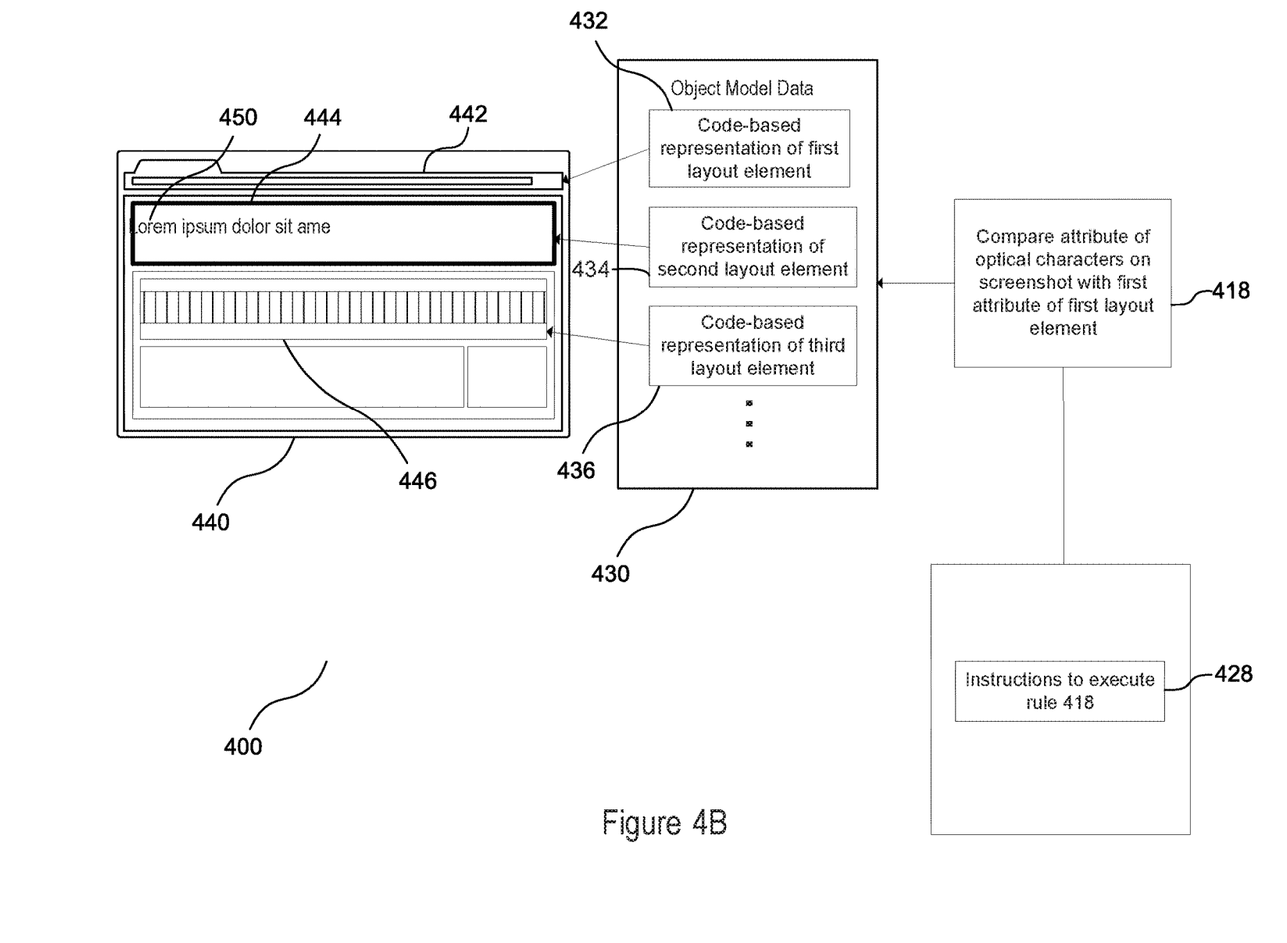

Turning back to FIG. 4B, an example layout error report is displayed on the visual rendering of application state 440. Specifically, layout error detection rule 418 may be executed by instructions 428 to compare an attribute of optical characters, such as a location of text on a visual rendering of an application state, with a first attribute of a first layout element, such as the location of layout element 444. Through comparison of the location of the text 450 with the location of layout element 444, a layout error may be identified, such as overflow text 450. A layout error report may be displayed such that layout element 444 is made visibly distinguishable from layout elements not exhibiting an error, such as layout elements 442 and 446. As an example, layout element 444 is made visibly distinguishable by a larger border width relative to layout elements 442 and 446. However, any number of methods may be implemented to visibly distinguish a layout element exhibiting a layout error from layout elements not exhibiting a layout error.

Figure 6:
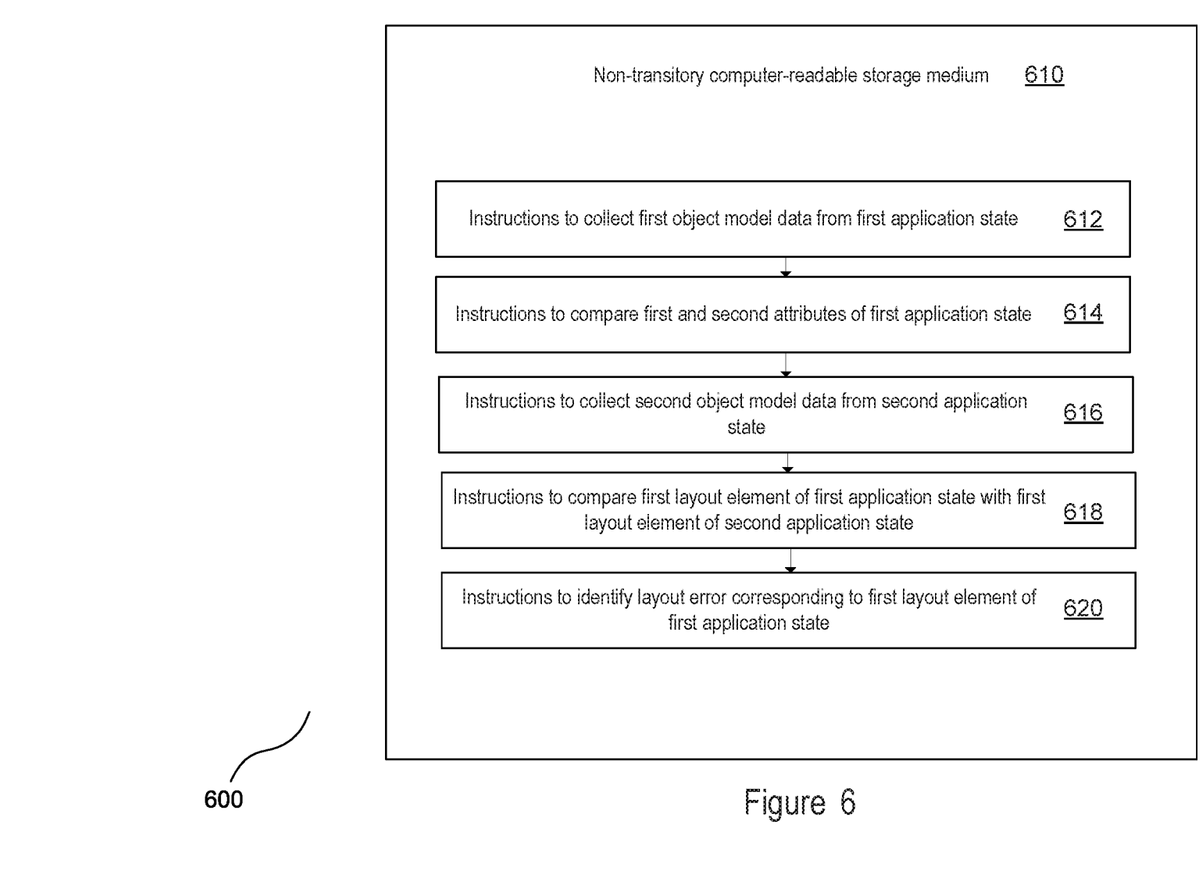
FIG. 6 is a block diagram further illustrating a non-transitory computer-readable storage medium according to some examples.

A layout error may be identified by comparing application states generated in different browser modes. FIG. 6 is a block diagram 600 illustrating a non-transitory computer-readable storage medium 610 for identifying a layout error, such as a second layout error, of an application state through comparison of a first and second application state. A first object model data from a first application state is generated in a browser mode, e.g. a first browser mode, according to instructions 612. Instructions 614 may cause a processor to execute a layout error detection rule. Specifically, a first attribute of the first layout element may be compared with a second attribute of the first layout element or of a second layout element according to instructions 614.

The non-transitory computer-readable storage medium may also provide instructions 616 executable by a processor to collect second object model data from a second application state generated in a second browser mode. Not all browsers render source code in an identical manner, as browsers may interpret source code differently. Therefore, the first application state may be generated differently by the first browser mode than the second application state generated by the second browser mode despite the first and second application state originating from the same source code. In one example, the second object model data may include a plurality of layout elements of the second application state.

Any number of attributes of the first layout element of the second application state may be collected. The attributes may include descriptors of respective layout elements, such as a location, tag name, class, shape, color, luminosity, font, z-index, id, border, margin, padding, text content, window width, window height, image width, image height, scroll width, scroll height, tab value, transition duration, etc. The attributes may also include data regarding the state of a layout element, such as whether the layout element is to include text, whether the layout element is to include certain characters, whether overflow from the layout element is visible, etc.

The first layout element of the first application state may be compared with the first layout element of the second application state according to instructions 618. In one example, attributes of the first layout element of the first application state may be compared with attributes of the first layout element of the second application state. For example, the number of attributes of the first layout element of the first application state may be compared to the number of attributes of the first layout element of the second application state. In another example, the type of attributes of the first layout element of the first application state may be compared to the type of attributes of the first layout element of the second application state.

A layout error corresponding to the first layout element of the first application state may be identified according to instructions 620. For example, a layout error of the first layout element of the first application state may be identified where the first layout element of the first application state and the first layout element of the second application state do not share the same number of attributes, or do not share the same type of attributes. A discrepancy in the number or type of attributes may indicate that the first application state generated by the first browser was generated substantially differently than the second application state generated by the second browser such that the first layout element of the first application state exhibits an identifiable layout error. Accordingly, a layout error may be identified by comparing the attributes of code-based representations of layout elements from application states generated in different browser modes.

Figure 7:
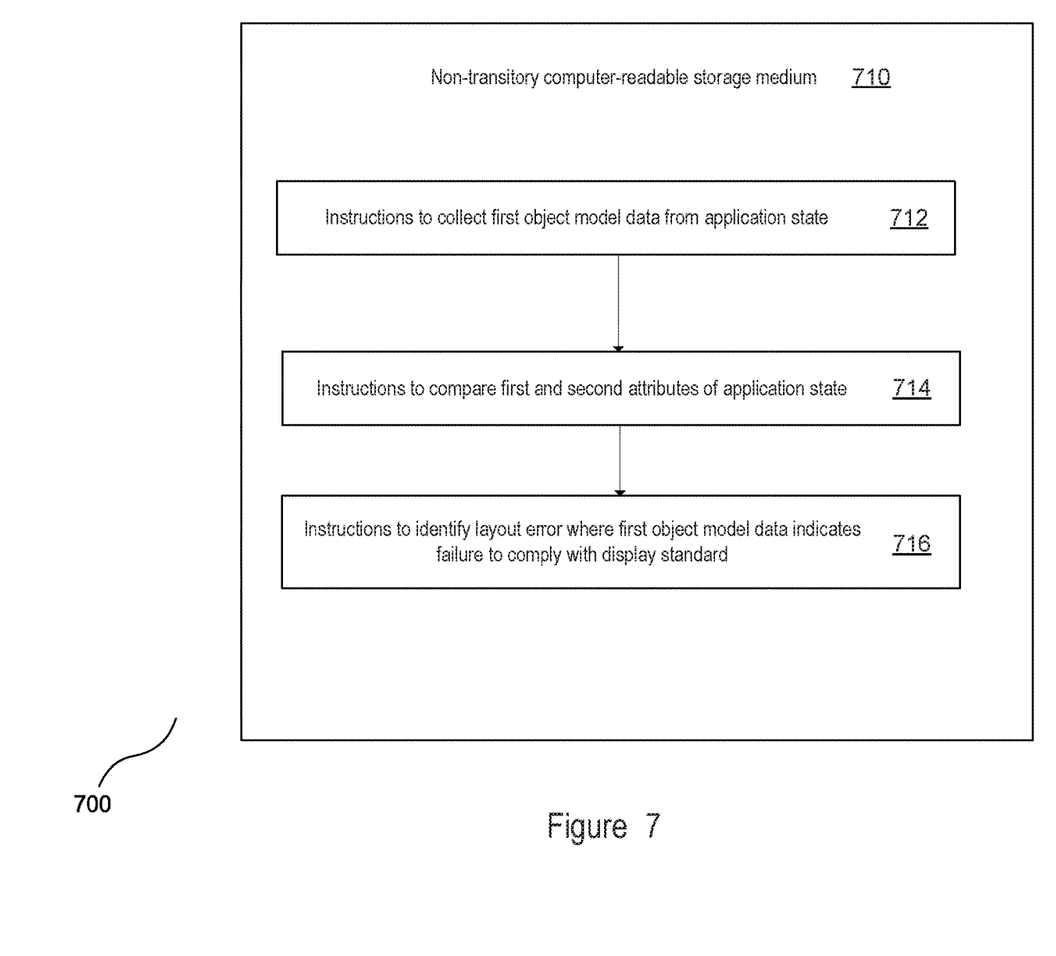
FIG. 7 is a block diagram further illustrating a non-transitory computer-readable storage medium according to some examples.

A layout error may be identified where object model data of an application state indicates that a visual rendering of the application state will fail to comply with a display standard. FIG. 7 is a block diagram 700 illustrating a non-transitory computer-readable storage medium 710 for identifying a layout error, such as a second layout error, of an application state failing to comply with a display standard.

First object model data is collected from an application state. The non-transitory computer-readable storage medium 710 may include instructions 712 executable by a processor to collect first object model data from an application state generated in a browser mode. The object model data may comprise a code-based representation of any number of layout elements of the application state, such as a first layout element and a second layout element of the application state. Through collection of the first object model data, any number of layout elements may be collected.

Included in the collection of layout elements may be attribute data of the layout elements. The attribute data may include descriptors of respective layout elements, such as a location, tag name, class, shape, color, luminosity, font, z-index, id, border, margin, padding, text content, window width, window height, image width, image height, scroll width, scroll height, tab value, transition duration, etc. The attributes may also include data regarding the state of a layout element, such as whether the layout element is to include text, whether the layout element is to include certain characters, whether overflow from the layout element is visible, etc. Accordingly, layout elements including attribute data for each respective layout element may be collected.

The non-transitory computer-readable storage medium 710 may include instructions 714 executable by a processor to execute a layout error detection rule. Specifically, instructions 714 may be executed by a processor to compare a first attribute of the first layout element with a second attribute of the first layout element or of a second layout element of the application state. In one example, the compared first and second attribute need not be of the same type. For instance, a first window width may be compared to a second window width, or a window width may be compared to a window height, scroll height, transition duration, etc.

The non-transitory computer-readable storage medium 710 may include instructions 716 executable by a processor to identify a layout error where the first object model data indicates a failure to comply with a display standard. Display standards may include, for example, a virtual button in a visual rendering of the application state for exiting the application state, a standard positioning or location of virtual buttons within a visual rendering of an application state, e.g. a virtual button for accepting a command should be juxtaposed or otherwise positioned relative to a virtual button for rejecting a command, etc.

For example, where the display standard is having a virtual button in a visual rendering of an application state, instructions 716 may include searching the first object model data for a code based representation of a layout element of the first application state corresponding to a virtual button for exiting the first application state. Upon failure to detect the layout element corresponding to the virtual button, a layout error may be identified. Accordingly, object model data may be searched for identifying a layout error corresponding to a failure of a visual rendering of the object model data to comply with a display standard.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject disclosed herein. However, various examples may be practiced without some or all of these details. Some examples may include modifications and variations from the details discussed above. It is intended that the appended claims cover such modifications and variations.

What is claimed is:

1. A non-transitory computer-readable storage medium comprising instructions executable by a processor to:
   collect first object model data from a first application state generated in a first browser mode, wherein the first object model data comprises a code-based representation of a first layout element and a second layout element of the first application state;
   identify through optical character recognition, optical characters on a screenshot of the first application state, the screenshot of the first application state comprising a visual rendering of the first layout element in the first browser mode;
   compare, in a first comparison and according to a layout error detection rule, a first attribute of the first layout element with a second attribute of the first layout element or of the second layout element;
   compare, in a second comparison, an attribute of the optical characters on the screenshot with the first attribute of the first layout element; and
   identify a layout error corresponding to the first layout element based on the first comparison of the first attribute with the second attribute and based on the second comparison of the attribute of the optical characters with the first attribute of the first layout element.

2. The non-transitory computer-readable storage medium of claim 1, wherein the attribute of the recognized optical characters is a location, style, or color as displayed on the screenshot.

3. The non-transitory computer-readable storage medium of claim 1, wherein the first layout element comprises a textbox having a first size or first location, and wherein the layout error is identified through determination that the recognized optical characters on the screenshot are not displayed within the textbox.

4. The non-transitory computer-readable storage medium of claim 1, wherein the first attribute of the first layout element comprises a location, tag name, class, shape, color, luminosity, font, z-index, id, border, margin, padding, text content, window width, window height, image width, image height, scroll width, scroll height, tab value, or transition duration.

5. The non-transitory computer-readable storage medium of claim 1, wherein the second attribute is different than the first attribute and comprises a location, tag name, class, shape, color, luminosity, font, z-index, id, border, margin, padding, text content, window width, window height, image width, image height, scroll width, scroll height, tab value, or transition duration.

6. The non-transitory computer-readable storage medium of claim 1, further comprising instructions executable by the processor to generate a layout error report responsive to identifying the layout error corresponding to the first layout element, the layout error report to display the first layout element on a visual depiction of the first application state such that the first layout element is visibly distinguishable from layout elements of the application state having no identified layout error.

7. The non-transitory computer-readable storage medium of claim 1, wherein the first layout element comprises a calendar date, the first attribute of the first layout element comprises a calendar date order, and the second attribute comprises a region in which the first application state is to be displayed, wherein the identified layout error is the calendar date order being inconsistent with a standard of the region in which the first application state is to be displayed.

8. The non-transitory computer-readable storage medium of claim 1, wherein the first attribute of the first layout element is a location of the first layout element, and the second attribute is a location of the second layout element, wherein the identified layout error corresponding to the first layout element is a misalignment of the first layout element with the second layout element.

9. The non-transitory computer-readable storage medium of claim 1, wherein the layout error is identified based on a discrepancy value between a value of the first attribute of the first layout element and a value of the second attribute.

10. The non-transitory computer-readable storage medium of claim 1, further comprising instructions executable by the processor to:
    collect second object model data from a second application state generated in a second browser mode, wherein the second object model data comprises a first layout element of the second application state;
    compare, in a third comparison and according to the layout error detection rule, the first layout element of the first application state with a first layout element of the second application state; and
    identify a second layout error corresponding to the first layout element based on the third comparison of the first layout element of the first application state with the first layout element of the second application state.

11. The non-transitory computer-readable storage medium of claim 1, further comprising instructions executable by the processor to identify a second layout error where the first object model data indicates a failure to comply with a display standard.

* * * * *